United States Patent [19]
Glushkov et al.

[11] 4,112,547
[45] Sep. 12, 1978

[54] AUTOMATICALLY ADJUSTABLE CUTTING APPARATUS FOR PURPOSES SUCH AS FILLETING FISH

[76] Inventors: Alexandr Ivanovich Glushkov, U.S.S.R., Murmansk, Ulitsa Sofii perovsko, 18 kv. 5; Sergei Vasilievich Krutov, U.S.S.R., Murmansk, Kolsky prospekt, 20, kv. 45; Vladimir Ivanovich Semenov, U.S.S.R., Murmansk, Uliksa Godzhieva, 11, kv. 17; Anatoly Fedorovich Gusev, U.S.S.R., Murmansk, Prospekt Lenina, x6, kv. 26; all of Murmansk, U.S.S.R.

[21] Appl. No.: 752,999

[22] Filed: Dec. 21, 1976

[51] Int. Cl.² ........................................... A22C 25/16
[52] U.S. Cl. ........................................... 17/57; 17/52
[58] Field of Search ............... 17/52, 57; 83/582, 504, 83/425.4

[56] References Cited

U.S. PATENT DOCUMENTS

| | | | |
|---|---|---|---|
| 1,194,694 | 8/1916 | Allen | 83/582 |
| 2,291,272 | 7/1942 | Wright | 83/504 |
| 2,470,289 | 5/1949 | Christiansen | 17/57 |
| 2,552,985 | 5/1951 | Levschner | 17/57 |
| 3,041,907 | 7/1962 | Gallagher, Jr. | 83/582 |
| 3,303,526 | 2/1967 | LaPine et al. | 17/57 |
| 3,458,897 | 8/1969 | Roger | 83/582 |
| 3,736,870 | 6/1973 | Johnson et al. | 101/348 |
| 3,759,178 | 9/1973 | Franchinot | 101/348 |
| 3,865,000 | 2/1975 | Stafford | 83/504 |
| 4,028,973 | 6/1977 | Bogdanski et al. | 83/504 |

FOREIGN PATENT DOCUMENTS 30,777  8/1884  Fed. Rep. of Germany ............ 83/504

*Primary Examiner*—Louis G. Mancene
*Assistant Examiner*—Paul J. Hirsch
*Attorney, Agent, or Firm*—Steinberg & Blake

[57] ABSTRACT

The apparatus disclosed relates to the fishing industry and incorporates a means of aligning the fish and a pair of circular knives mounted in hubs on a shaft with provision for their displacement along said shaft. According to the invention, the possibility for the knives to displace along the shaft is realized through the intermediary of a resilient member movably linked-up with the shaft and the hubs as well as through screwed joints of opposite directions provided between the shaft and the hubs of the knives. The recourse to the apparatus disclosed assures good economy of the process of severing the fillets from the backbone and fins of the fish under the conditions of mass production.

10 Claims, 10 Drawing Figures

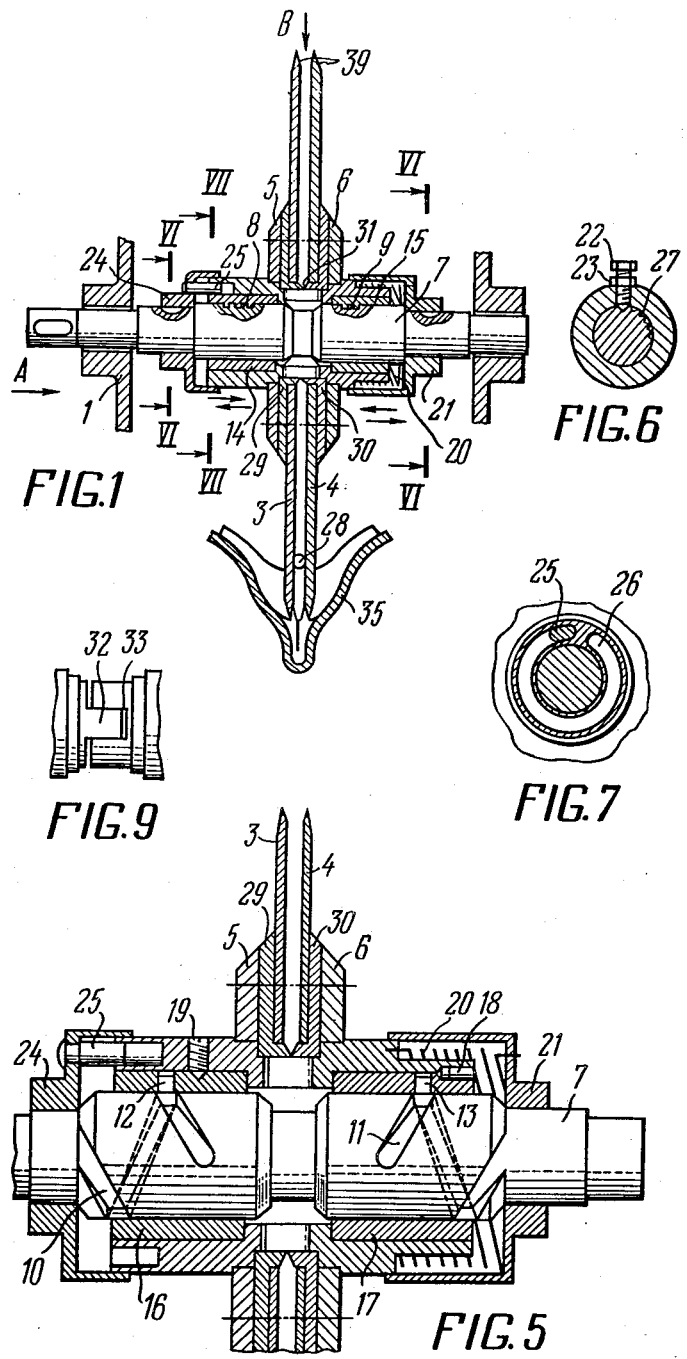

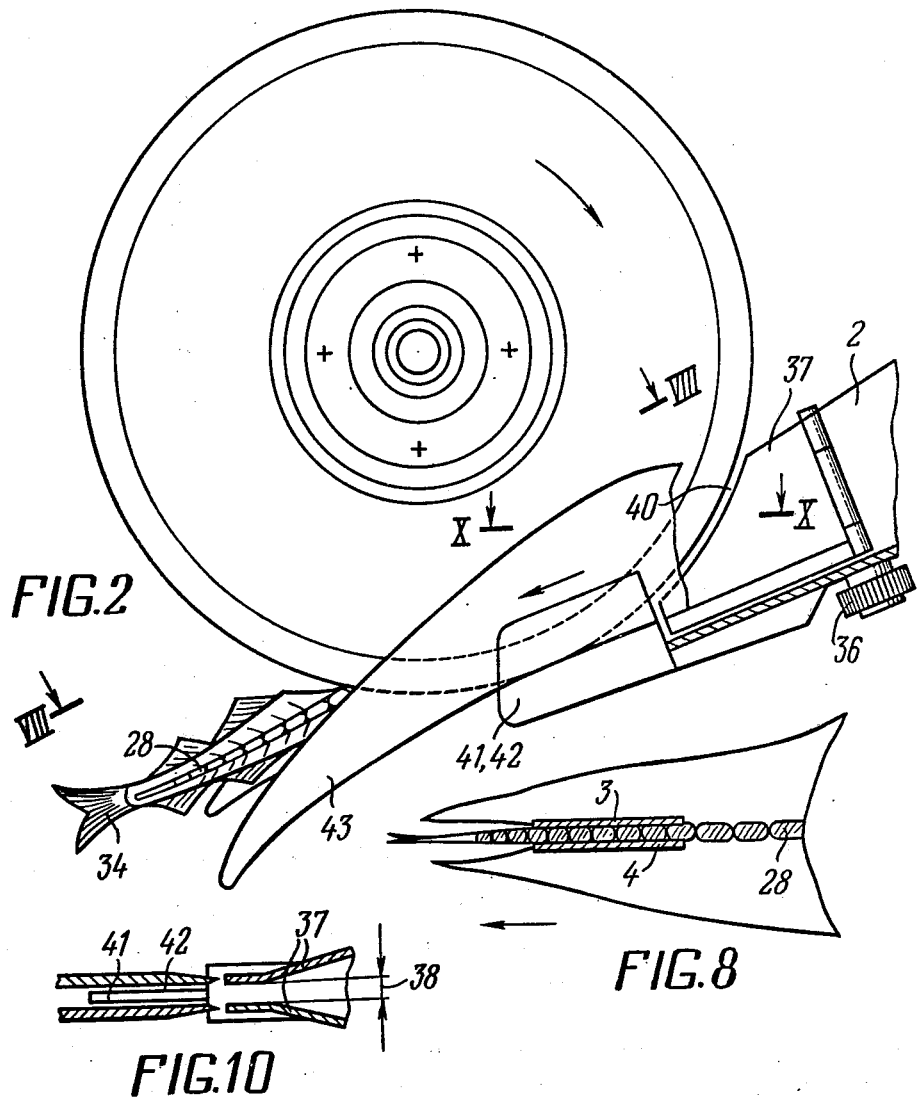

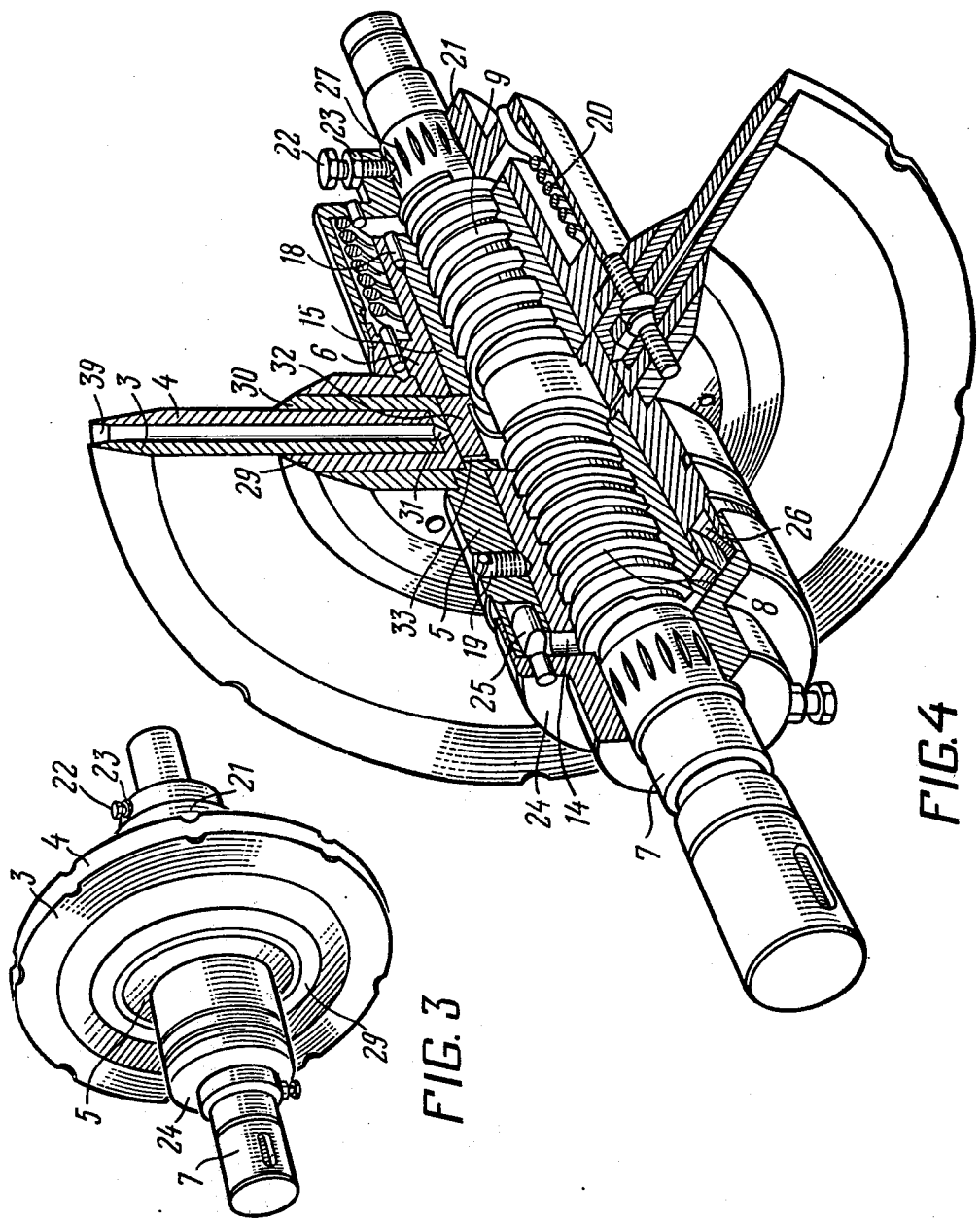

AUTOMATICALLY ADJUSTABLE CUTTING APPARATUS FOR PURPOSES SUCH AS FILLETING FISH

The present invention relates to the equipment for the fishing industry, and more particularly to apparatus for filleting fish. It may be used to advantage in fish processing machinery of the kind found on board fishing vessels, at fish processing factories and elsewhere in the fishing industry. The all best results are obtainable in filleting any round fish varying in size between 25 to 80 cm.

Known in the art are apparatus for filleting fish incorporating a pair of circular knives which cut the back and belly of the fish to its backbone. The final severing of the fillets from the backbone is the task coped with by one more pair of knives as the fish travels down the machine wherein the apparatus is installed.

The pair of circular knives is fitted with a constant gap between the knife surfaces, said gap being determined by the size of the largest fish processed in the machine. This implies that smaller fish are likely to be filleted with considerable waste of food product which is a serious drawback of mechanized fish processing taking into account the shortage of proteins available for food on the world-wide scale. On the other hand, if the gap is made too narrow then remnants of the backbone will be cut off with the flesh — an alternative which is also intolerable.

For controlling the gap between the pair of knives, there is known a means comprising cams and leverage built so as to obey the law governing the relationship between the size of a fish and the taper of its backbone. However, in spite of the fact that fish of different size and belonging to different species may have backbones of approximately the same taper, the base of this taper differs in size so that the means for controlling the width of the gap between the pair of knives is to be adjusted for processing the fish with the widest base of the taper. Consequently, the waste of food product is again unavoidable in processing small-sized fish. An attempt to change the gap will spoil the fillets of larger fish by the remnants of the backbone embedded therein.

Also known is an apparatus for filleting fish wherein the width of the gap between a pair of circular knives is changed by setting a handwheel, fitted with a detent, into certain positions depending on the size of the fish processed. In other words, the gap is preset. Said presetting calls for grading the fish in advance according to the size — an operation slashing the effectiveness of mechanized processing of fish without an appreciable increase in the output of food product.

In said apparatus, the width of the gap between the surfaces of the knives forming the pair is set by means of two rods connecting the handwheel to the knives and running inside a tubular shaft mounted whereon are the hubs of the knives. Each of the hubs is rigidly linked up with its respective rod and with the handwheel the detent whereof can snap into any of several notches in a disc secured on the tubular shaft. The handwheel is provided with two helical grooves of opposite directions fitting wherein are pins rigidly secured in the rods. If the handwheel is turned by hand, this causes the knives to displace synchronously from their initial position in opposite directions along the shaft. Incorporated into the apparatus is also a means of aligning the fish comprising a conveying trough, tapered multiple-thread screws which convey the fish and a hold-down device of prismatic shape embracing the fish so as to guide it towards the pair of ciruclar knives.

The apparatus operates on the following lines. Fish, beheaded and gutted, are placed on the conveying trough feeding them into the tapered multiple-thread screws which rotate and take over the conveying of the fish towards the pair of circular knives. The width of the gap between the surfaces thereof is set in advance by turning the handwheel, linked up with the hubs of the knives by means of the rods, into a certain position depending on the size of the fish wherein the handwheel is locked by the detent. Said pair of knives cuts only the back and belly to the backbone. The final severing of the fillets from the backbone is done by another pair of knives. The fish is aligned by the spring-loaded prismatic hold-down device which gives the backbone of each fish correct orientation relatively to the peir of cutting circular knives.

Further known is an apparatus for filleting fish comprising a device for aligning the fish and a pair of circular knives fitted in hubs on a shaft with provision for displacing along same depending on the size of the fish. To provide for the displacement of the knives along the shaft, the latter is either splined or fitted with keys. A synchronous displacement of the knives closer to each other is possible due to a system of levers and gear segments movably linked-up with the hubs of the knives. The pair of the knives sets itself relatively to the cross section of the backbone, the dimensions whereof are changing, on its own accord by virtue of the pressure the backbone of the fish exerts on the cutting edges of the circular knives so as to displace same along the shaft in opposite directions. Serving the purpose of aligning the fish preparatory to feeding its caudal fin between the knives is a prismatic trough and a pair of guide strips interposed between the knives at the top and bottom with a gap enabling the caudal fin to pass therebetween as well as a pair of flaps separated also by a gap passing wherethrough is the caudal fin, said flaps deflecting sidewise when acted upon by the flanks of the fish. However, inherent in said apparatus is a low sensitivity to the pressure exerted by the backbone on the knife edges, said drawback resulting from possible jamming of knives on the shaft due to cockbilling. Said drawback calls for setting the knives with an initial gap as wide as 7 to 10 mm with the consequence that the filleting is done in a non-sparing way incurring much wastage of the food product.

It is thus evident that the known apparatus wherein a pair of circular knives is fitted with no provision for changing the width of the gap therebetween or wherein the law governing the way said gap should be changed is programmed in a cam mechanism or wherein the width of the gap is set either by turning a handwheel preparatory to processing or by applying a force exerted eccentrically by the backbone on the edges of the knives all fail to assure versatility in processing fish of various size and species and call for the grading of fish in advance. Moreover, in processing fish in the known apparatus the yield of the food product is anything but a thrifty one.

It is an object of the present invention to eliminate said disadvantages.

An important object of the present invention is to provide an apparatus for filleting fish wherein a synchronous displacement of circular knives is assured in opposite directions depending on the size of the backbone of the fish in cross section.

Another important object of the present invention is to provide an abovementioned apparatus displaying good economy in severing the fillets from the backbone and fins of the fish and suitable for use under the conditions of mass production.

Said and other objects are attained with the aid of the disclosed apparatus for filleting fish incorporating a means of aligning the fish and a pair of circular knives mounted in hubs on a shaft with provision for their displacement along the shaft wherein, in accordance with the invention, the possibility for the knives to move along the shaft is realized through the intermediary of screwed joints of opposite directions provided between the shaft and the hubs of the knives as well as through a resilient member movably linked-up with the hubs and the shaft.

The essence of the invention consists in that the circumferential efforts at the cutting edges of the knives are different when subject to cutting are fleshy or bony tissues of the fish. Said circumferential efforts, in their turn, bring about a torque and, as a consequence, cause the knives to turn about the axis of the shaft. The fact that the screwed joints between the hubs of the knives are provided one with a right-hand thread and the other with a left-hand thread in conjunction with the fact that the resilient member is capable of withstanding the force set up in cutting fleshy tissues but twists in cutting a bone assures that the knives synchronously displace along the shaft in opposite directions so as to set themselves relatively to the cross section of the backbone of the fish processed on their own accord.

By virtue of the disclosed construction of the apparatus, good economy is achieved in severing the fillets from the backbone and fins of the fish which is a factor of paramount importance under the conditions of mass production. A solution like that disclosed herein requires neither the grading of fish according to the size and species nor the setting of the gap between the knives comprising the pair in advance so as to be able to process graded fish of given size.

It is preferred, for the sake of simplicity of fabrication, that the screwed joints are provided in the form of square threads on the shaft and in the hub. Such joints are characterized by simplicity of fabrication, for square thread can be readily cut in a lathe. Apart from that, square thread, unlike trapezoidal and triangular threads, provides for a sliding fit between the hubs of the knives and the inside diameter of the shaft.

It is also preferred, for the sake of enhancing the wear resistance of the mating surfaces of the hubs and shaft, to provide the screwed joints in the form of helical grooves cut in the shaft and hubs. The helical grooves progress within the distance of the pitch and, consequently, do not impair the integrity of the shaft surface very much.

The resilient member is provided in the form of a torsion spring featuring an expanded pitch one end whereof is secured to one of the hubs and the other is affixed through a retainer to the shaft, the adjustment of said spring assuring that the minimal circumferential effort applied when the pair of circular knives makes a cut is sufficient for cutting through fleshy tissues of the fish but is too weak to cut a bone. In addition, a torsion spring represents the most simple form of a resilient member from the standpoint of its fabrication.

It is preferred to provide the hubs of the knives with an end face coupling so as to assure that the hubs displace synchronously along the shaft integrally with the knives.

It is further preferred, for the sake of simplicity of both manufacture and design, to provide the end face coupling in the form of a dog coupling.

A specific embodiment of the present invention will be now described by way of example with reference to the accompanying drawings, in which:

FIG. 1 is a sectional elevation of the apparatus for filleting fish according to the invention with the case partly removed;

FIG. 2 is a view in the direction of arrow A of FIG. 1;

FIG. 3 is a general perspective view of the apparatus for filleting fish according to the invention;

FIG. 4 is a view similar to FIG. 3 with some of the parts cut away, on an enlarged scale;

FIG. 5 is a sectional elevation of the apparatus disclosed in another embodiment;

FIG. 6 is a section on line VI—VI of FIG. 1;

FIG. 7 is a section on line VII—VII of FIG. 1;

FIG. 8 is a section on line VIII—VIII of FIG. 2;

FIG. 9 is a view in the direction of arrow B of FIG. 1;

FIG. 10 is a section on line X—X of FIG. 2.

Disclosed herein is an apparatus for filleting fish in a case 1 (FIG. 1) whereof there are secured a means 2 of aligning the fish (FIG. 2) and a pair of circular knives 3 and 4 (FIGS. 1 through 4) mounted in hubs 5 and 6, respectively, on a shaft 7 with provision for displacement along same. The knives 3 and 4 are set spinning by a drive (not shown).

According to the invention, the possibility for the knives 3 and 4 to displace along the shaft 7 is realized through the intermediary of screwed joints of opposite directions provided between the shaft 7 and the hubs 5 and 6 of the knives 3 and 4, respectively, as well as through a resilient member movably linked-up with the hubs 5 and 6 and with the shaft 7. Referring to FIG. 1, the screwed joints are provided in the form of a right hand square thread 8 and a left hand square thread 9 in the shaft 7 and similar threads in the hubs 5 and 6 of the knives 3 and 4, respectively.

Referring to FIG. 5 illustrating another embodiment of the screwed joints, cut in the shaft 7 are helical grooves 10 and 11 of opposite directions whereas fitted into the hubs 5 and 6 are blocks 12 and 13, respectively. The threads proper are cut in bushings 14 and 15 (FIGS. 1 and 4) fitted into the hubs 5 and 6, respectively, and fitted into the hubs 5 and 6 are also bushings 16 and 17 (FIG. 5) secured wherein are the blocks 12 and 13, respectively. The bushings 14 and 15 as well as those shown at 16 and 17 are made from noncorrodible materials displaying low friction, eliminating thus the need to use a nonferrous noncorrodible metal with a low friction, say bronze, as the material of the hubs 5 and 6. The bushings 14, 15 and 16, 17 are held fast in the hubs 5 and 6 by a pin 18 and a screw 19.

Used as the resilient member is a torsion spring 20 one end whereof is attached to the hub 6 of the knife 4 and the other, to a retainer 21 mounted on the shaft 7 and secured thereto by a screw 22 (FIG. 6) and a lock nut 23. The retainer 21 serves to adjust the initial torque of the spring 20 by being turned about the shaft 7. The spring 20 features an expanded pitch between the coils, said feature assuring for the hubs 5 and 6 of the knives 3 and 4, respectively, the possibility of displacing along the shaft 7.

For adjusting the width of the gap between the knives 3 and 4, the shaft 7 is provided with a ring 24 (FIG. 1). A stop 25 (FIG. 7) provided on the ring 24 fits into an annular discontinuous groove 26 (FIG. 7) found in the hub 5 of the knife 3. The ring 24 is held fast to the shaft 7 in the same way as the retainer 21. The taper tips of screws 22 fit into serrations 27 (FIG. 6) provided in journals of the shaft 7, giving the retainer 21 and the ring 24 reliable protection against the possibility of being turned on their own accord. Said way of holding down the retainer 21 and the ring 24 is provided taking into account the fact that both these parts have to be turned about the shaft 7 in the course of adjusting the apparatus for operation. While the retainer 21, if turned, serves to set the minimal circumferential effort at the edges of the pair of circular knives 3 and 4 required to cut the flesh from the backbone 28 (FIGS. 1,2,8) of the fish, the ring 24 (if also turned) sets the gap between the pair of disc knives 3 and 4 to the minimal required width. The knives 3 and 4 are attached to disc protectors 29 and 30 (FIG. 1) provided with bevels 31 and the protectors 29 and 30, in their turn, are fitted to the hubs 5 and 6 of the knives 3 and 4, respectively.

The hubs 5 and 6 of the knives 3 and 4 are provided with an end face coupling. Projections 32 (FIG. 9) on the hub 5 enter recesses 33 in the hub 6 so as to form a dog coupling which prevents the knives 3 and 4 from rotating relatively to each other but enables the hubs 5 and 6 to displace along the shaft 7 in a manner assuring absolute synchronism of the displacement of the knives 3 and 4 along the shaft in opposite directions.

For accurate aligning of the caudal fin 34 (FIG. 2) of the fish relatively to the gap between the circular knives 3 and 4 the apparatus is provided with a means 2 of aligning comprising a V-shaped trough 35 and flaps 37 capable of turning synchronously due to the action of a pair of gear segments 36 or toggles so that the outlet edges thereof form a gap 38 (FIG. 10) of a width equal to, or smaller than, the width of the gap between the knives 3 and 4. The outlet edges of the flaps 37 are arranged in close proximity to cutting edges 39 of the knives 3 and 4 so that a clearance 40 (FIG. 2) between said edges is never in excess of 0.5 mm or otherwise the caudal fin 34 of the fish can emerge outside the knives 3 and 4. Thin strips 41 and 42 (FIG. 10) at the outlet end of the trough 35 form a gap which guides the caudal fin 34 of the fish accurately between the knives 3 and 4.

The feeding trough 35 along with the aligning members 37, 41 and 42 are secured to the case 1 of the apparatus at an angle to the horizontal so as to enable the feeding of the fish to the knives 3 and 4 due to gravity without a recourse to special feeding devices.

The apparatus operates on the following lines. Preparatory to processing fish, the gap between the pair of circular knives 3 and 4 is set to its minimum width by turning the ring 24 about the shaft; the ring 24 is then locked on the shaft 7 by the screw 22 and the nut 23. Next, a pilot batch of fish is fed into the apparatus for the purpose of adjusting the minimal circumferential effort at the cutting edged of the knives 3 and 4 so as to provide for the cutting of flesh but causing the spring 20 to twist as soon as the knives 3 and 4 come into contact with the backbone 28 of the fish. Said adjustment is made by turning the retainer 21 about the shaft 7 followed by the locking of the retainer 21 on the shaft 7 by the screw 22 and the nut 23.

The fish, the caudal fin 34 first and belly upwards, moved due to gravity over the feeding trough 35 towards the pair of circular knives 3 and 4. As the fish moves between the knives 3 and 4 the latter cut flesh off the beginning portion of the tail. The caudal fin 34 is aligned in the vertical plane while passing through the gap 38 so as to enter the gap between the knives 3 and 4. If the cutting edge 39 of one of the knives 3 or 4 comes in contact with the backbone 28 of the fish, the tail is forced towards the cutting edge 39 of the other knife 4 or 3. At this stage, the self-aligning of the backbone 28 of the fish takes places relatively to the knives 3 and 4. Further progress of the fish results in an increase in the cutting effort at the edges 39 of the knives 3 and 4, this being quite natural due to an increase in the cross section of the backbone 28. Since the cutting edges 39 of the knives 3 and 4 are given a special backset sharpening, the friction coming into play between the knives 3 and 4 and the backbone 28 increases. The knives 3 and 4 turn through a certain angle relatively to the axis of the shaft 7 against the action of the torsion spring 20 and, simultaneously, synchronously displace along the shaft 7 away from the initial position in opposite directions, the square threads of opposite directions (the left-hand 9 and the right-hand 8) provided at the joints causing this displacement. The knives 3 and 4, as if sliding alongside the backbone 28, cut off the flesh 43 (fillets), leaving the backbone 28 intact. The onward progress of the fish at this instant is induced by the forces of friction existing between the knives 3 and 4 and the backbone 28 as well as by a component of the cutting effort. The fillets 43 sliced off the backbone 28 are fed in requisite direction for further processing. The backbones 28 integrally with the fin 34 ejected from the apparatus by the knives 3 and 4 are fed into a certain place for processing, for example, into fish meal, fish soup and the like.

As soon as the fish has passed between the knives 3 and 4, the torsion spring 20 causes the knives 3 and 4 to turn about the shaft 7 so as to return same into the original position whereat the width of the gap therebetween is at its minimum. The apparatus is thus prepared for processing the next fish.

The end face dog coupling formed by the recesses 33 in the hub 5 and the projections 32 on the hub 6 prevents the knives 3 and 4 from turning relatively to each other so as to assure an absolutely synchronous displacement thereof along the shaft 7 in opposite directions from the initial position.

The disc protectors 29 and 30 remove by means of their sharp bevels 31 all lumps of flesh stuck to the coupling halves when the knives 3 and 4 return into their initial position.

The ring 24 with its stop 25 fitting into the discontinuous annular groove 26 provided in the hub 5 limits the range over which both hubs 5 and 6 are capable of turning about the shaft 7 integrally with the knives 3 and 4 so as to set the minimal and maximal gaps between the knives 3 and 4.

The apparatus disclosed serves to mechanize the labor consuming and hazardous process of slicing the fillets off the backbone of fish and provides for a thrifty way of obtaining a food product. Unlike other filleting machines used in the fishing industry, said apparatus is characterized by simplicity of construction, minimum maintenance and protracted service life. Low cost renders it suitable for both big and small owners. The apparatus can have utility as a self-contained machine for filleting fish in the wake whereof further processing is carried on, if necessary, such as separating of ribs, cleaning the belly pit of the black film, skinning, etc. Alternatively, the apparatus can be built into a multipurpose fish filleting machine with the aim of reducing wastage of product and improving the quality of fillets. The apparatus can be used on board fishing vessels or at shore-based fish-processing factories.

If somewhat modified, the apparatus can perform as a scaler capable of removing bony growths from the skin of fish.

Moreover, the apparatus, if modified in a certain way, may fine application in other industries for coping with the job of separating surface layers of an article from a harder core as, for example, in barking trees, etc.

Finally, the apparatus can be adapted for polishing irregularly shaped components, both spherical and flat. The mounting effort at the periphery of the tools which causes same to turn about the shaft in conjunction with the screwed joints incorporated into the apparatus provide for following the contour of the workpiece automatically.

It is thus apparent that with the apparatus of the invention there is a rotary shaft means 7 and a pair of circular disc-shaped cutting means 3 and 4 coaxially mounted on the shaft means 7 for rotation therewith, the pair of cutting means 3 and 4 being axially spaced from each other so as to define between themselves a gap through which part of the material which is cut, such as the spine and bones of a fish, is adapted to pass. A thread means formed in part at the shaft means and in part at at least one of the cutting means threadedly interconnects at least this one cutting means with the shaft means not only for turning movement therewith but also for turning movement with respect thereto so as to adjust the width of the gap. A spring means 20 is operatively connected between this one cutting means and the shaft means for yieldably and resiliently resisting turning of the one cutting means with respect to the shaft means, by way of said thread means, until this one cutting means encounters a resistance to rotation with the shaft means sufficient to overcome the force of the spring means, whereupon the latter yields so that at least the one cutting means by way of the thread means can displace itself axially along the shaft means in a direction which will increase the width of the gap. Of course when this resistance diminishes the spring means will act to return the one cutting means to its initial position on the shaft means. Of course, in the construction illustrated a pair of oppositely directed thread means is formed at the shaft means and at the pair of cutting means for connecting them to the shaft means for rotation therewith while providing for equal and opposite movement of the pair of cutting means with respect to each other to increase and decrease the gap, the dog coupling 32, 33 forming a means connecting the pair of cutting means to each other in a manner preventing relative rotation therebetween while permitting axial movement thereof toward and away from each other. The ring 24 forms an adjusting means operatively connected to the other of the cutting means for turning the latter with respect to the shaft means so as to adjust the initial magnitude of the gap, with the groove 26 cooperating with the stop 25 so as to limit the extent to which the pair of cutting means can move apart from each other. Of course the retainer 21 forms an adjusting means operatively connected with the spring means 20 for adjusting the force thereof.

What is claimed is:

1. In an automatically adjustable cutting apparatus, such as a fish filleting apparatus, rotary shaft means and a pair of disc-shaped cutting means coaxially mounted on said shaft means for rotation therewith and axially spaced from each other to define between themselves a predetermined gap through which material such as the spine and bones of a fish can pass, thread means formed on said shaft means and at least at one of said cutting means for providing at least at said one cutting means not only rotation with said shaft means but also the possibility of turning relative to said shaft means for changing the width of said gap, and spring means connected between said one cutting means and said shaft means for yieldably and resiliently resisting turning of said one cutting means with respect to said shaft means, said spring means yielding when said one cutting means encounters a sufficient resistance to turning together with said shaft means, for providing then for relative turning of said one cutting means with respect to said shaft means at said thread means in a direction which will increase the width of said gap, said spring means operating when said resistance diminishes to return said one cutting means with respect to said shaft means back toward an initial position of said one cutting means on said shaft means.

2. The combination of claim 1 and wherein a pair of said thread means, which are oppositely directed, are respectively formed at said shaft means and said pair of cutting means for providing for equal and opposite movement of said pair of cutting means axially along said shaft means toward and away from each other for changing the size of said gap, and connecting means operatively connected with both of said cutting means for interconnecting the same for rotation together while providing for axial movement thereof toward and away from each other.

3. The combination of claim 2 and wherein said connecting means is in the form of a dog coupling including an axial projection on one of said cutting means and an axial opening on the other of said cutting means receiving said axial projection.

4. The combination of claim 2 and wherein said pair of cutting means respectively include hub portions which surround said shaft means, said hub portions respectively having inner surfaces surrounding and engaging exterior surface portions of said shaft means, and said inner surfaces of said hubs and said exterior surface portions of said shaft means being formed with said oppositely directed thread means.

5. The combination of claim 4 and wherein said thread means is in the form of square threads.

6. The combination of claim 4 and wherein the inner surface of each of said hubs and the exterior surface of said shaft means surrounded thereby form a pair of surfaces one of which is formed with a helical groove and the other of which fixedly carries a boss extending into said groove to form the thread means interconnecting each of said cutting means with said shaft means.

7. The combination of claim 2 and wherein an adjusting means is operatively connected with said spring means for adjusting the force thereof.

8. The combination of claim 7 and wherein said spring means is in the form of a coil spring surrounding said shaft means and having one end fixed with said one cutting means, said adjusting means including a ring surrounding said shaft means and fixed to the other end of said spring, and means for adjustably fixing said ring at a given angular position with respect to said shaft means for adjusting the force of said spring means.

9. The combination of claim 2 and wherein an adjusting means is operatively connected with the other of said cutting means for initially adjusting the angular position thereof with respect to said shaft means, for initially adjusting the width of said gap.

10. The combination of claim 9 and wherein said adjusting means includes a hub of said other cutting means having an outer end face and a ring turnable with respect to said shaft means and carrying a means for releasably fixing said ring to said shaft means at a selected angular position with respect thereto, said ring having an end face next to said outer end face, one of said end faces having formed with a circumferential groove extending through less than 360°, and a boss fixed to the other end face and extending into said circumferential groove for cooperating with one end thereof for adjusting said gap, while said other cutting means can turn with respect to said ring during automatic adjustment of said gap within an angular limit determined by engagement between the other end of said groove and said boss.

* * * * *